US007723643B2

(12) United States Patent
Hackel et al.

(10) Patent No.: US 7,723,643 B2
(45) Date of Patent: May 25, 2010

(54) LASER PEENING FOR REDUCING HYDROGEN EMBRITTLEMENT

(75) Inventors: Lloyd A. Hackel, Livermore, CA (US); Tania M. Zaleski, Livermore, CA (US); Hao-Lin Chen, Lafayette, CA (US); Michael R. Hill, Davis, CA (US); Kevin K. Liu, Newark, CA (US)

(73) Assignees: Lawrence Livermore National Security, LLC, Livermore, CA (US); University of California, Davis, CA (US)

( * ) Notice: Subject to any disclaimer, the term of this patent is extended or adjusted under 35 U.S.C. 154(b) by 968 days.

(21) Appl. No.: 11/400,618

(22) Filed: Apr. 6, 2006

(65) Prior Publication Data

US 2007/0221641 A1 Sep. 27, 2007

Related U.S. Application Data

(60) Provisional application No. 60/668,928, filed on Apr. 6, 2005.

(51) Int. Cl.
*B23K 26/00* (2006.01)

(52) U.S. Cl. .................... 219/121.85; 148/565

(58) Field of Classification Search ............ 219/121.85; 148/565, 525
See application file for complete search history.

(56) References Cited

U.S. PATENT DOCUMENTS

| 4,444,599 | A * | 4/1984 | Ikeya ........................ 148/565 |
| 6,238,187 | B1 * | 5/2001 | Dulaney et al. ......... 416/241 R |
| 6,292,584 | B1 * | 9/2001 | Dulaney et al. ........ 219/121.85 |
| 6,410,884 | B1 * | 6/2002 | Hackel et al. .......... 219/121.85 |
| 2005/0045607 | A1 * | 3/2005 | Tenaglia et al. ........ 219/121.85 |
| 2006/0102609 | A1 * | 5/2006 | Dane et al. ............ 219/121.85 |

OTHER PUBLICATIONS

Brass et al., "Role of shot-peening on hydrogen embrittlement of a low-carbon steel and a 304 stainless steel", Dec. 1991, Chapman & Hall, Journal of Materials Science, vol. 26, pp. 4517-4526.*
Peyre et al., "Laser-shock processing of aluminum-coated 55C1 steel in water-conefinement regime, characterization and application to high-cycle fatigue behavior", Dec. 1998, Chapman & Hall, Journal of Materials Science vol. 33, pp. 1421-1429.*

* cited by examiner

*Primary Examiner*—Geoffrey S Evans
(74) *Attorney, Agent, or Firm*—John P. Wooldridge (57) ABSTRACT

A laser peening process for the densification of metal surfaces and sub-layers and for changing surface chemical activities provides retardation of the up-take and penetration of atoms and molecules, particularly Hydrogen, which improves the lifetime of such laser peened metals. Penetration of hydrogen into metals initiates an embrittlement that leaves the material susceptible to cracking.

10 Claims, 4 Drawing Sheets

Figure 3 – Microhardness values vs. depth of the as-received specimen

Figure 4 – Microhardness values vs. depth of the hydrogen charged specimen

Figure 5 - Microhardness values vs. depth of the laser peened specimen

Figure 6 - Microhardness values vs. depth of the laser peened and hydrogen charged specimen Figure 7 - Microhardness values as a function of normalized depth (z/t for t is specimen thickness) for all 4 specimen conditions

LASER PEENING FOR REDUCING HYDROGEN EMBRITTLEMENT

This application claims priority to U.S. Provisional Patent Application Ser. No. 60/668,928, titled: "Laser Peening for Reducing Hydrogen Embrittlement", filed Apr. 6, 2005, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser peening, and more specifically, it relates to methods of laser peening a metal to prevent the absorption and adsorption by that material of deleterious atoms and molecules.

2. Description of Related Art

Hydrogen embrittlement is a major cause of metal failure especially fastener failure. The prevailing thought is that steels with a Rockwell hardness above C30 are vulnerable. Titanium and aluminum alloys are also susceptible to hydrogen reactions. The phenomenon is well known, although the precise mechanism has been elusive despite extensive research. A number of mechanisms have been proposed, and most are considered to have at least some merit. A widely held theory is that susceptibility to hydrogen embrittlement is related directly to the trapped population in the material. Generally, hydrogen embrittlement can be described as absorption and adsorption of hydrogen which promotes enhanced de-cohesion of the material (e.g., steel), primarily as an intergranular phenomenon.

Electroplating is a major cause of hydrogen embrittlement. Some hydrogen is generated during the cleaning and pickling cycles, but by far the most significant source is cathodic inefficiency, which is followed by sealing the hydrogen in the parts. Baking is often performed on high strength parts to reduce this risk. For the production plater, having to remove the parts from the production line to bake, followed by a separate chromating process, is a laborious process.

Hydrogen will penetrate into materials along grain boundaries and dislocations, hastening hydrogen embrittlement. Hydrogen diffuses along the grain boundaries and combines with the carbon, which is alloyed with the iron, to form methane gas. The methane gas is not mobile and collects in small voids along the grain boundaries where it builds up enormous pressures that initiate cracks. In nuclear power plants without aluminum components, hydrogen embrittlement is a primary reason that reactor coolant is maintained at a neutral or basic pH.

If the metal is under a high tensile stress, brittle failure can occur. At normal room temperatures, the hydrogen atoms are absorbed into the metal lattice and diffused through the grains, tending to gather at inclusions or other lattice defects. If stress induces cracking under these conditions, the path is transgranular. At high temperatures, the absorbed hydrogen tends to gather in the grain boundaries and stress-induced cracking is then intergranular. The cracking of martensitic and precipitation hardened steel alloys is believed to be a form of hydrogen stress corrosion cracking that results from the entry into the metal of a portion of the atomic hydrogen that is produced in the following corrosion reaction.

Hydrogen embrittlement is not a permanent condition. If cracking does not occur and the environmental conditions are changed so that no hydrogen is generated on the surface of the metal, the hydrogen can re-diffuse from the steel, so that ductility is restored.

To address the problem of hydrogen embrittlement, emphasis is placed on controlling the amount of residual hydrogen in steel, controlling the amount of hydrogen pickup in processing, developing alloys with improved resistance to hydrogen embrittlement, developing low or no embrittlement plating or coating processes, and restricting the amount of in-situ (in position) hydrogen introduced during the service life of a part.

Sources of hydrogen causing embrittlement have been encountered in the making of steel, in processing parts, in welding, in storage or containment of hydrogen gas, and related to hydrogen as a contaminant in the environment that is often a by-product of general corrosion. It is the latter that concerns the nuclear industry. Hydrogen may be produced by corrosion reactions such as rusting, cathodic protection, and electroplating. Hydrogen may also be added to reactor coolant to remove oxygen from reactor coolant systems. Hydrogen entry, the obvious pre-requisite of embrittlement, can be facilitated in a number of ways. Some manufacturing operations such as welding, electroplating, phosphating and pickling facilitate hydrogen entry. If a material subject to such operations is susceptible to hydrogen embrittlement, then a final baking heat treatment is employed to expel any hydrogen. Hydrogen entry may be caused as a by-product of a corrosion reaction such as in circumstances when the hydrogen production reaction acts as the cathodic reaction since some of the hydrogen produced may enter the metal in atomic form rather than be all evolved as a gas into the surrounding environment. In this situation, cracking failures can often be thought of as a type of stress corrosion cracking. If the presence of hydrogen sulfide causes entry of hydrogen into the component, the cracking phenomenon is often termed "sulphide stress cracking (SSC)". Hydrogen entry can result from the use of cathodic protection for corrosion protection if the process is not properly controlled.

Hydrogen embrittlement has been a problem for metals in a number of industries, especially in petroleum and gas production, where high concentrations of $H_2S$ are frequently encountered. Other hydrogen rich environments in which processes are employed, such as electroplating, picking, casting, corrosion and fuel cell reactions, have also been found to produce hydrogen damage in metals. Hydrogen atoms diffuse through the surface of metals into interstitial lattice sites or through microstructural channels such as grain boundaries, dislocation pile-ups, carbides, and defects. Once excessive hydrogen atoms are trapped and accumulated inside the metal several damage mechanisms may occur, including cracking, blistering, hydride formation, decarburization at elevated temperature and altering of tensile strength and lowering of ductility. Consequently, these deleterious effects lead to degradation of mechanical properties, and may result in eventual structural failure.

Austenitic stainless steels are employed in large quantities in these industries because of their high strength and good corrosion resistance. Their low diffusivity and high solubility of hydrogen in the FCC lattice structures provide generally good resistance to hydrogen damage in many aggressive aqueous environments. However, it has been found that with enough hydrogen permeation, austenitic stainless steels can become embrittled, and that brittle fracture has occurred in severe environmental conditions such as cathodic charging.

Hydrogen rich environments such as fuel cell reactors can exhibit damage caused by hydrogen permeation in the in the form of Hydrogen Induced Cracking (HIC) and Stress Oriented Hydrogen Induced Cracking (SOHIC). Both processes are known to decrease material ductility and can lead to corrosion cracking or failure in equipments. Although coatings and liners have been investigated by industry, there has been no definitive laser peening method referenced in literature with respect to preventing or retarding hydrogen embrittlement.

SUMMARY OF THE INVENTION

It is an object of the present invention to provide an improvement in a method of laser peening a metal workpiece that retards the up-take and penetration of atoms or molecules.

It is another object of the invention to provide methods for laser peening a metal surface and sub-layer to densify the metal surface and said sub-layer to initiate retardation of the up-take and penetration of hydrogen.

These and other objects will be apparent based on the disclosure herein.

The invention is based on the discovery that a certain threshold of parameters in a laser peening process for the densification of metal surfaces and sub-layers and for changing surface chemical activities provides retardation of the up-take and penetration of atoms and molecules, particularly hydrogen, which improves the lifetime of such laser peened metals. Penetration of hydrogen into metals initiates an embrittlement that leaves the material susceptible to cracking. The surface densification induced by this laser peening process has been shown to be successful in preventing stress corrosion cracking (SCC) for stainless steels in power plants. The present inventors have demonstrated a method whereby the densification of near surface material and changing its chemical activity induced by laser peening delays the penetration of hydrogen into a material. The consequence is greater resistance to hydrogen induced cracking (HIC) and Stress Oriented Hydrogen Induced Cracking (SOHIC) in metals.

One field of application for this invention is in deuterium and tritium production and storage. Equipments used in the production of these hydrogen isotopes often have finite service lives due to degradation by hydrogen penetration. The process can be used to extend the life of components that store hydrogen and its isotopes and to extend the life of a broad range of metals subjected to corrosive environments. Such critical parts include gas storage vessels for nuclear weapons, the tools and machines used to form these components and equipment used to produce the gas and nuclear storage containers. Increasing the lifetime of these components will greatly reduce the operational cost of the processing, will improve safety and reliability and will enable higher performance and denser gas storage.

Hydrogen embrittlement is a significant problem in a broad range of industries. Also, lifetime improvements will have significant impact as the United States moves to a hydrogen based fuel economy. This process will improve hydrogen fuel cell performance and will allow for safer and denser storage of hydrogen.

Figure 1:
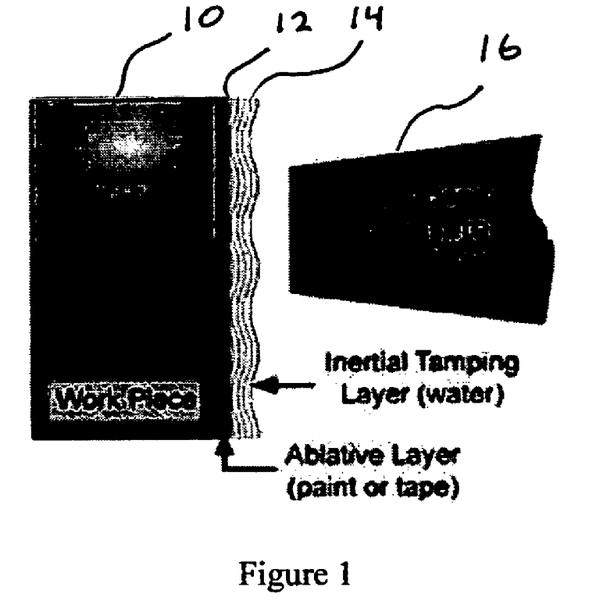
FIG. 1 illustrates a laser peening process.
Figure 2:
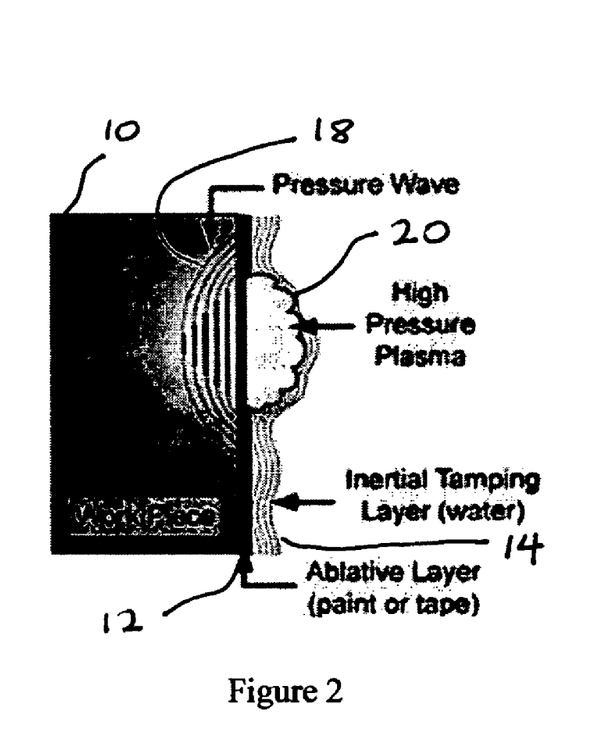
FIG. 2 illustrates the pressure wave and the high pressure plasma generated in a laser peening process.

The invention uses the technology of laser peening in which a surface is peened with one or more layers of peening, producing densification of the surface layer and changing its chemical activity such that penetration of hydrogen or other atoms or molecules is retarded. Basic approaches to laser peening have been described in a number of patents and papers. See, e.g., U.S. Pat. No. 6,805,970, titled: "Laser Peening of Components of Thin Cross-Section", incorporated herein by reference. However, the laser peening parameters useful for retarding the up-take and penetration of atoms and molecules to improve the lifetime of containment vessels and related equipment, and particularly to retard the penetration of hydrogen into metals to reduce hydrogen embrittlement, have been unknown until now. FIG. 1 illustrates a laser peening process where a workpiece 10 is covered with an ablative layer 12 of paint or tape that is covered with an inertial tamping layer 14 of water. A laser beam 16 is directed toward the workpiece. FIG. 2 illustrates the pressure wave 18 and the high pressure plasma 20 generated in the laser peening process of FIG. 1.

In the basic prior art process, a laser beam is directed to a surface to be peened. The surface can be covered with an ablative/insulating layer such as aluminum adhesive or it can be peened as bare metal. A tamping or confinement layer such as water is usually made to flow over the area to be peened to confine the shock wave created by the laser.

The laser beam is rastered relative to the area to be peened with a pulse of the laser impinging on each raster spot. The area is then uniformly covered one or more times. The ablation from the laser generated shock wave creates an intense shock wave that plastically yields the surface and densifies it to a depth of 1 mm or more depending on the laser parameters, the material type and the number of surface treatments. The laser shock process also changes the chemical activity of the peened surface.

Experimental results generated by exposing treated and untreated samples to a dense hydrogen environment have shown that the samples treated with the present process of laser peening had a three times reduction in the transmission of hydrogen into the metal surface. Thus, by reducing the diffusion rate and concentration of hydrogen in the metal, a reduction is achieved in the effects of embrittlement such as HIC, SOHIC and associated fatigue failures.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Deleterious effects due to hydrogen embrittlement can be significantly reduced by applying a process that densifies the material deeply beyond the surface, cutting off penetration paths for the hydrogen and at the same time induces compressive stress to retard propagation of cracks created locally by hydrogen induced internal flaws.

As such, a laser peening process that simultaneously induces residual stress and increases the density of the material as deeply as possible in the near surface material with minimal generation in intergranular disruptions will be the preferred approach to minimize the penetration of hydrogen. Consequently a laser peening process which peens with a long pulse (greater than 20 ns), with a large footprint (greater than 20 mm² area) and with repeated applications (3 or more layers of peening) will have the best performance in retarding hydrogen penetration and thus hydrogen embrittlement.

Since the intense laser-generated shock front is the mechanism that compresses the material, a longer shock pulse enables this compression to run deeper before the rarefaction, due to the end of the laser pulse, catches up to the shock front and dissipates the peening action. A 20 ns pulse runs deeper than a 10 ns pulse and a 30 ns pulse would run even deeper yet. For hydrogen embrittlement applications, a 20 ns or longer pulse duration is effective.

Of equal importance to achieving a deep penetration of the compression is to perform the peening with a relatively large footprint. As the laser beam penetrates into the material it naturally diffracts and consequently loses intensity as the refraction penetrates into the beam center from the edges. As the compression shock wave penetrates into the material at the speed of sound, the refraction wave propagates in from the sides at essentially the speed of sound also. Thus, the larger the initial footprint of the laser, the deeper will be the penetration of the high intensity before rarefaction. In order to achieve a penetration of several millimeters, a beam with at least 16 J of energy was delivered to the metal and configured into a footprint of at least 3 mm on a side comprising a 9 mm² spot area. Even larger spots using greater laser energy are preferred.

Multiple layers of peening can produce deeper levels of compression as a shock wave that is propagating through once compressed material will run faster and consequently with less rarefaction. Thus repeated processing of an area will result in deeper levels of compressed material and consequently greater resistance to hydrogen penetration. Thus, a process for reducing hydrogen embrittlement utilized three or more layers of peening each layer being a full coverage of the intended area. By using a processing beam that has a square or rectangular cross-section, peening areas next to each other with approximately 3% overlap of spots is achievable.

One exemplary test studied laser peening for the reduction in hydrogen permeation in a Titanium alloy. Three areas of study were conducted: laser peening the material, hydrogenation, and hydrogen detection. Of particular interest is the potential benefit for applications in deuterium and tritium production and storage. Equipment used in the production of these hydrogen isotopes often have finite service lives due to degradation by hydrogen penetration. Extending the lifetime would potentially have significant cost savings as well as implications for higher performance. Hydrogen embrittlement also will have significant impact as the USA moves to a hydrogen based fuel economy. This process could potentially improve fuel cell performance and could allow for safer and denser storage of hydrogen.

The particular Titanium alloy tested was Ti-6Al-4V double phase. One coupon was laser peened with a beam comprising a power density of 10 GW/cm² at an 18 ns pulse width. Two layers of peening were applied to all sides of the coupon. This treatment is abbreviated: "10-18-2".

Cathode charging process was performed on as-received and laser peened specimens. Each specimen was fully immersed in a vessel of a four-port electrochemical cell containing an aqueous electrolytic charging solution of 5% $H_2SO_4$ at ambient temperature. A precision power supply was connected by clip leads to the three electrodes and provided a constant, uniform exchange current density of 10 mA/cm² onto the specimen over a charging duration of 144 hours.

The parameters for the secondary ion mass spectroscopy (SIMS) measurement are as follows: A pattern 250 μm×250 μm in size was rastered across the surface of the coupon, to a depth of 85 μm. The ions collected from this trace were compared with a standard reference material (352c) containing Hydrogen concentration of 49.0±0.9 μg/g in unalloyed Titanium. The trace made on the NIST standard material was assumed to be homogeneous.

Four main ions were recorded in each sample, $^{16}O^-$, $^1H^{1-}$, $(^{48}Ti^{+16}O)^-$, and $O^{3-}$. The scans of each coupon showed very consistent levels of each ion to the depth measured and the counts of each ion were consistent over each scanned volume. This shows the material to be fairly uniform in the region measured, allowing a fair comparison of each ion concentration between the two samples.

The data showed the recorded ion counts for each ion measured. When compared to the standard, our samples showed almost ten times the ratio of $H^{1-}$ ions as compared to the standard, or roughly 490 μg/g. This demonstrates our ability to measure the H content in our Ti-6Al-4V material and quantify its concentration. Since we wanted to compare the H embedding depth in laser peened (LP) versus non-laser peened (nonLP) samples, our next step was to measure three coupons with various treatments using a step scan method.

For this test on Titanium, the step-scans performed on the H-Charged (HC) and the laser peened plus H-Charged (LP+HC) suggest the hydrogen to Titanium ratio (H—Ti) was roughly constant through the sample. The data shows that the laser peened plus H-Charged (LP+HC) sample contained significantly less hydrogen than the otherwise identical non laser peened sample. Specifically the LP+HC sample contained roughly the same hydrogen content as the uncharged samples; whereas the HC coupon contained roughly three times the background level of hydrogen.

Another exemplary test studied the effects of laser peening on hydrogen permeation behavior in austenitic 3161 stainless steel. Before fully investigating the effects of laser peening on the problems of hydrogen embrittlement, it is important to first understand the migration behavior of hydrogen when it is diffused into the material and what impacts are generated from laser peening on the diffusion behavior. Thus in light of interests and as an attempt to clarify the uncertainties, an initial experiment was been performed to explore the effects of laser peening on hydrogen diffusion behavior in the austenitic stainless steel by comparing the hydrogen concentration of peened and non laser peened samples exposed to hydrogen-rich environments.

In the study of the effect of laser peening on the hydrogenation of austenitic stainless steel, three steps were taken: laser peening, hydrogenation, and hydrogen detection. The basic physics and theories behind laser peening are well understood and have been presented. See, e.g., J. E. Rankin, M. R. Hill, L. A. Hackel, Material Science and Engineering, A00 (2003) 1-13; and G. Hammersley, L. A. Hackel, F. Harris, Optics & Lasers in Engineering, 34 (2000) 327-337. Until now, however, the laser peening parameters required to effectively retard uptake of Hydrogen were unknown.

Hydrogenation is a hydrogen absorption process in which hydrogen atoms are cathodically charged and uploaded into a metal sample. The sample essentially behaves as an "ionic sink" in which a supplied current donates $e^-$ into the metal, making it an attractive "sponge" for the positive ions. The $H^+$ ion in the solution will then be attracted to the metal $e^-$ due to the charge balance for neutralization. When two hydrogen $H^+$ ions combine with the metal $e^-$, a $H_2$ atom is formed. See, e.g., A. Valiente, L. Caballero, J. Ruiz, Nuclear Engineering and Design, 188 (1999) 203-216. The deposition process can be described as $$2H^+ + 2e^- \rightarrow H_2. \tag{1}$$

For diffusion to occur into the material, a majority of the $H_2$ atoms must permeate through the surface of the metal and into interstitial lattice sites or through microstructural channels and remain trapped inside the metal. See, e.g., G. M. Fontana, N. D. Greene, Corrosion Engineering $2^{nd}$ Ed. McGraw Hill (1978) 109-115, 301-303.

Several hydrogen detection techniques have been proposed in literature (e.g., electrochemical permeation, Gorsky relaxation, gas permeation, internal friction measurements, etc). See, e.g., R. Balasubramaniam, Journal of Alloys and Compounds, 293-295 (1999) 279-281. However, a simpler method of subsurface Vickers microhardness profiling proposed by Balasubramaniam et al. was utilized in place of other complex techniques for this work. See, e.g., P. Kumar, R. Balasubramaniam, Journal of Alloys and Compounds, 255 (1997) 130-134. Studies have demonstrated the usefulness of this method for determining hydrogen diffusivities in several materials (e.g., Al—Li alloys, austenitic stainless steels, and several iron aluminides). The motivations for employing this method are based on the direct correlation of the behavior of microhardness and of hydrogen concentration, which is derived from Fick's Second Law of Diffusion, and the availability of equipment to carry out the method.

Assume the hydrogen transport is a non-steady state diffusion mechanism through the interstitial lattice of material at ambient temperature; Fick's Second Law of Diffusion states:

$$\frac{\partial C_H(x,t)}{\partial t} = D_H \frac{\partial^2 C_H(x,t)}{\partial x^2}, \tag{2}$$

where $C_H(x, t)$ is the function of hydrogen concentration in terms of diffusion depth $x(\mu m)$, and time $t(s)$. $D_H$ is the intrinsic diffusivity or diffusion coefficient of hydrogen for the sample material in the conditions of the experiment See, e.g., D. A. Porter, K. E. Easterling, Phase Transformations in Metals and Alloys $2^{nd}$ Ed., Chapman & Hall, UK, 1992, pp. 73-74. Solving equation (2) with boundary conditions: $C_H(x=0, t)=Cs$ and $C_H(x, t=\infty)=Cb$, where Cs is the concentration at the surface and Cb is the bulk concentration in the sample yields:

$$C(x,t) = C_s - (C_s - C_b)\mathrm{erf}\left(\frac{x}{2\sqrt{D_H t}}\right) \tag{3}$$

or $$\frac{C(x,t) - C_b}{C_s - C_b} = 1 - \mathrm{erf}\left(\frac{x}{2\sqrt{D_H t}}\right). \tag{4}$$

In order to correlate microhardness profile with concentration profile of the diffusing species, four reasonable assumptions were made. First, the variation in microhardness with depth for the as-received (uncharged, non laser peened) specimen is constant Second, $C(x, t)-C_b$ is proportional to the increase in MHv over the bulk value, i.e., $(MHv-MHv_b)$. Third, the diffusion process only occurs through a single phase; there was no internal phase transformation in the diffusion field. Fourth, the diffusion coefficient was constant in the entire diffusion zone. Based on the assumptions, a dimensionless correlation can be obtained as:

$$\frac{C(x,t) - C_b}{C_s - C_b} = \frac{MHv(x,t) - MHv_b}{MHv_s - MHv_b} \tag{5}$$

where $MHv_s$ is the microhardness value at the near surface of the specimen and is the microhardness at the bulk of the material. Substitute equation (4) into (5), the direct correlation of microhardness and diffusivity coefficient is obtained. This equation will be the basis for modeling the hydrogen distribution by the microhardness distribution as a function of depth from the surface and into the bulk of the material:

$$\frac{MHv(x,t) - MHv_b}{MHv_s - MHv_b} = 1 - \mathrm{erf}\left(\frac{x}{2\sqrt{D_H t}}\right). \tag{6}$$

The as-received AISI 316L austenitic stainless steel (solution annealed 1900° F. and water quenched) was sectioned, using wire EDM, into 25.4 mm by 25.4 mm and 6.35 mm thick square samples. All surfaces of the samples were ground up to 600-grit finish to maintain a uniform surface finish.

Residual stress experiments were performed for optimizing the peening parameters to obtain the highest and deepest residual stress in 316L stainless steel. The peening parameters that were selected include an irradiance of 10 GW/cm², a pulse width of 18 ns, 2 peening layers, 3.0 mm average peening spot size, and a 50% spatial offset, or "overlap" from one peening layer to another (10-18-2-50%). Laser peening was applied, with these parameters, on all 6 surfaces of the samples.

Cathodic charging was performed on the as-received and laser peened specimens. Each specimen was fully immersed in a vessel of a four-port electrochemical cell containing an aqueous electrolytic charging solution of 5% $H_2SO_4$ at ambient temperature. The vessel was partially immersed in a Dow Corning 200 silicone oil bath in a thermostat unit to maintain a constant test solution temperature. The test cell used a platinum counter electrode, a Luggin probe to position the Ag/AgCl reference electrode in a water-cooled jacket away from the test solution, an aerator (gas bubbler) to purge the test solution with nitrogen gas or air, and a condenser column to keep the bath from evaporating during the test. The specimen was suspended in the bath through the larger central port. A precision power supply or potentiostat with the capability of 300 mA was connected by clip leads to the three electrodes and provided a constant, uniform exchange current density of 10 mA/cm² onto the specimen over a charging duration of 144 hours.

After cathodic charging, all specimens: as-received, peened, non laser peened and hydrogenated, and laser peened and hydrogenated were sectioned at half length and through the thickness of the specimen using a precision saw. The sectioned pieces were then immediately mounted in a cold setting epoxy resin such that the cross-sectional surfaces of the specimens were exposed. The exposed surfaces were mechanically polished to a 0.05 μm surface finish.

Subsurface microhardness (MHv) profiling was performed using a Leitz Wetzlar Metallux 3 Vickers Microhardness Tester (equipped with a diamond indenter and an optical microscope of 500× magnification) on the exposed cross-sectional surfaces of the as-received, peened, hydrogenated, and peened and hydrogenated specimens. An indentation load of 100 gf was applied, over a dwell time of 10 seconds, for each indent. The diagonals of each indent were measured from the attached optical microscope and the microhardness values were calculated using the formula:

$$MHv = \frac{2000P\sin(\alpha/2)}{d^2} = \frac{1854.4P}{d^2}, \quad (7)$$

where d is the mean diagonal of the indentation (μm), P is the applied load (gf), and α is the face angle of the indenter (136°). Starting from approximately 40 μm deep from the free surface (xz plane) as to eliminate the surface effect, the microhardness values were obtained at the location of x=z=0 and y from −40 μm to the opposite edge (through thickness) of the disk specimen. Profiles were taken at such location is to avoid the possible effects of laser peening induced residual stress from the vertical surfaces in the x-direction and z-direction.

To ensure a higher hydrogen detection resolution, indent spacing was adjusted according to each of the four specimen conditions. In general, a minimal indent spacing of 2.5 d should be applied to minimize measurement errors caused by indent distortion due to both elastic and plastic deformation and a strain field around each indent. For the laser-peened specimens, the averaged d was recorded to be approximately 32 μm and thus, an indent spacing of 100 μm (3.12 d indent spacing) through the thickness of the specimen was applied. For the hydrogenated specimens and higher detection resolution is desired, the average d was recorded as 27.5 μm and an indent spacing of 50 μm (1.8 d indent spacing) within the first and last 500 μm of the thickness and 100 μm of spacing in between was applied. Two profiles as both functions of microhardness value and depth of sample were averaged and interpolated to account for non-hydrogen related microstructural variations and to obtain a more accurate data.

The averaged subsurface microhardness profiles of 316L stainless steel for all 4 specimen conditions: as-received, as-received and hydrogen charged, as-received and laser peened, laser peened and hydrogen charged were obtained. The maximum scatter for microhardness measurement was ±5 MHv. Such scatter was calculated from repeatedly measuring the exact microhardness indent for 5 times of each profile and recording the maximum deviation from the average microhardness value of the 5 measurements.

Figure 3:
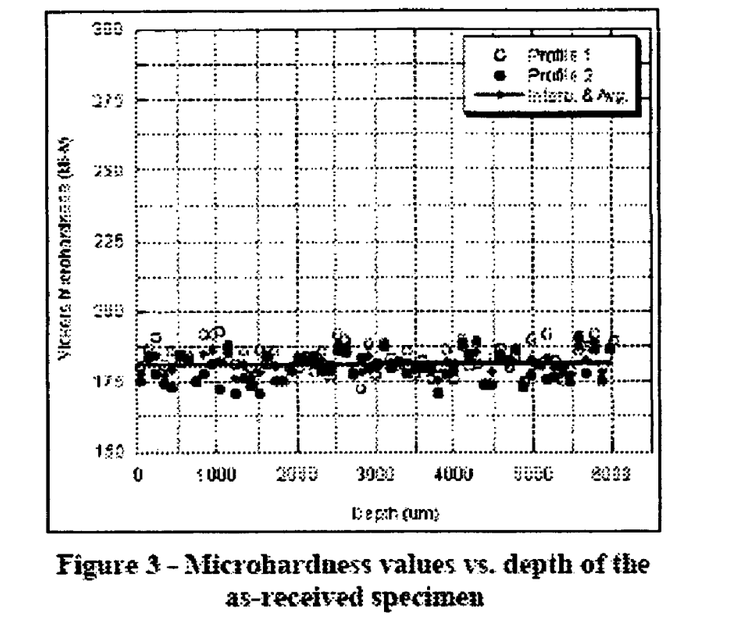
FIG. 3 is a plot of the MHv data for an "as-received" metal work-piece.

The as-received MHv data was obtained as a basis value for comparison (FIG. 3). It also serves to validate the assumption of constant microhardness values from surface to bulk for the untreated (unpeened and uncharged) specimen. As measured, the averaged microhardness value was found to be approximately 181 MHv and the values are fairly constant throughout the thickness of the specimen. A linear line fit of the data was also included to better represent the MHv data trend.

Figure 4:
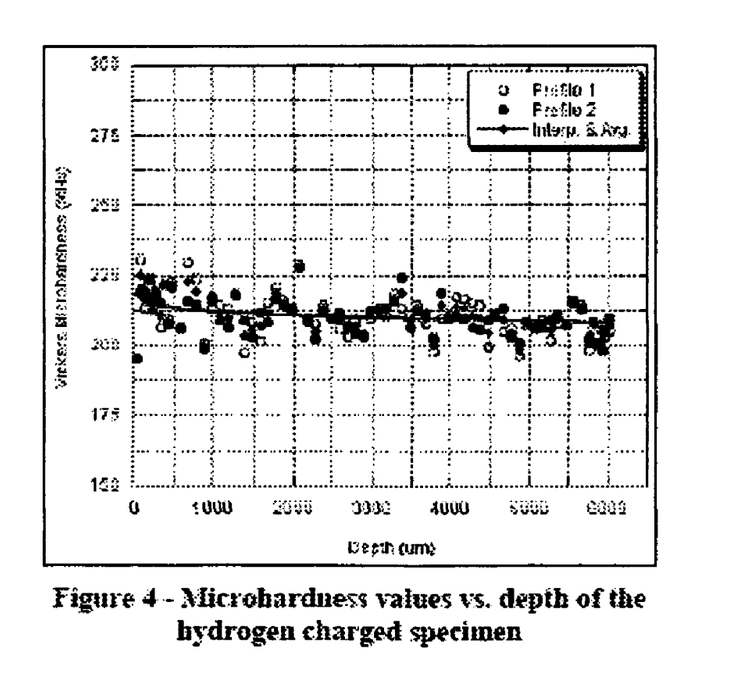
FIG. 4 is a plot of the MHv profiles for a hydrogen charged specimen.

The MHv profiles for the hydrogen charged specimen were obtained (FIG. 4). A through-thickness hardening effect was observed. Microhardness value of approximately 223 MHv was recorded at near surface and the profile then gently decreased to a plateau value of approximately 210 MHv through the thickness of the specimen. Overall a 30-40 MHv increase from the values obtained from the as-received specimen. A logarithmic line fit was also applied to better represent the MHv data trend.

Figure 5:
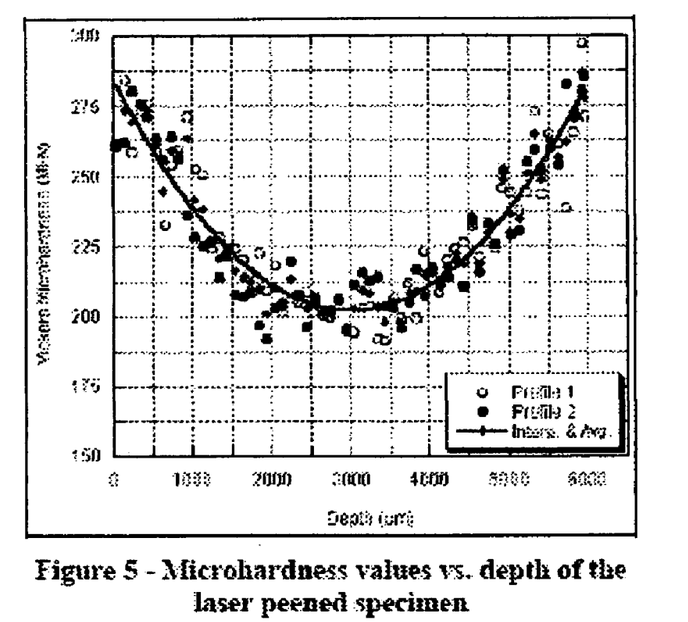
FIG. 5 is a plot of the MHv profiles for a laser peened specimen.

The MHv profiles for the laser peened specimen were obtained (FIG. 5). The data looks fairly symmetrical across the thickness of the specimen. The concavity falls right in the half thickness of the specimen. At near surface, the MHv value was found to be approximately 280 MHv and at near half thickness, the MHv value was approximately 205 MHv. Thus a ~75 MHv difference from the surface to the bulk of the material was observed. The depth of the work-hardening effect from laser peening is found to be approximately 3 mm deep into the specimen. A polynomial line fit was included to better represent the MHv data trend.

Figure 6:
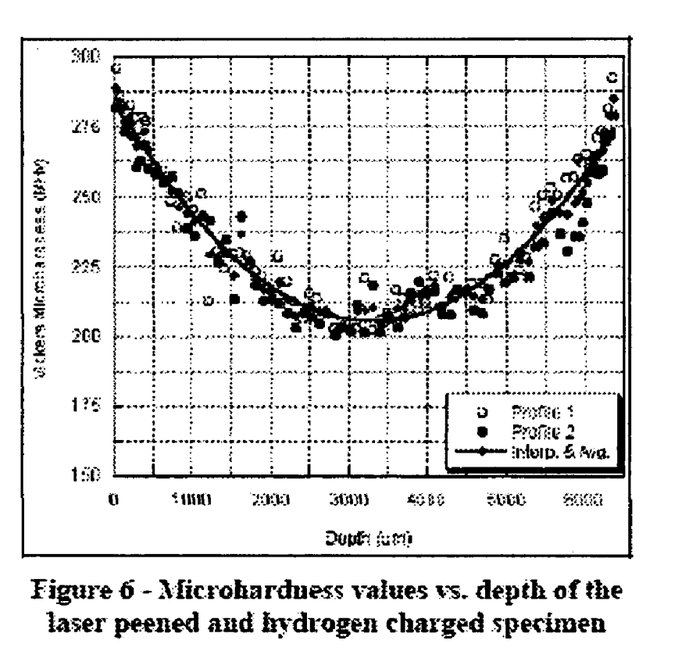
FIG. 6 is a plot of the MHv profiles for the laser peened and hydrogenated specimen.

The MHv profiles for the laser peened and hydrogenated specimen were obtained (FIG. 6). The data again looks fairly symmetrical across the thickness of the specimen. Similar to the laser-peened specimen, the concavity falls right in the half thickness of specimen. At near surface, the MHv value was found to be approximately 290 MHv and at near half thickness, the MHv value was approximately 205 MHv. Thus a ~85 MHv difference from the surface to the bulk of the material was observed. A polynomial line fit was also included to better represent the MHv data trend.

Figure 7:
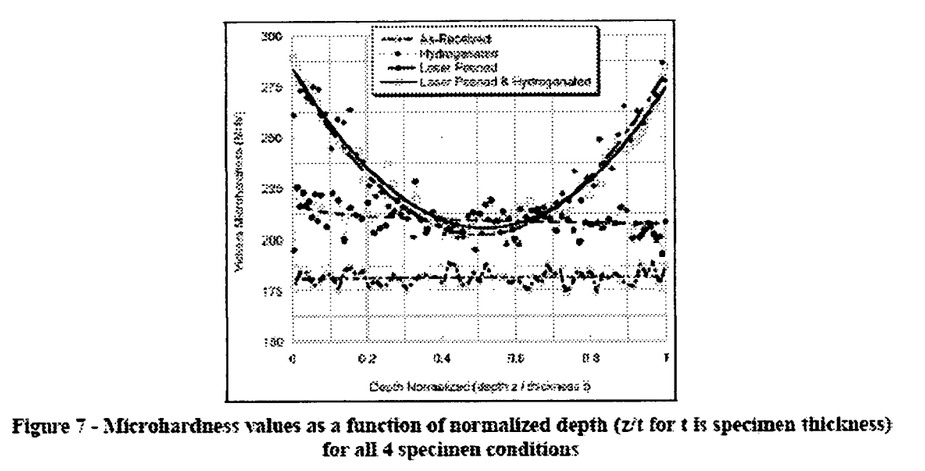
FIG. 7 is a plot of the MHv data as a function of the normalized depth for four specimen conditions.

A plot of the MHv data as a function of the normalized depth (z/t where t is the thickness of the specimen) for all four of the specimen conditions is presented for the purpose of an overall comparison (FIG. 7). Looking at the hydrogenated and as-received data, an increase of approximately 30-40 MHv through thickness was observed from the hydrogenated specimen. In comparing the laser peened and laser peened and hydrogenated data, the two profiles seem to be fairly similar. The microhardness at near the two surfaces are almost identical but at near the half thickness (x/t=0.5) of the specimen, the microhardness of the laser-peened specimen is about 4 MHv lower than the value of the laser peened and hydrogenated specimen. But overall, the two profiles show a very similar behavior throughout the thickness of the specimen.

In comparing the microhardness data of the laser peened specimen and the laser peened and hydrogenated specimen, no distinct differences are found (FIG. 7). The initial microhardness values at near surface for the two specimens are relatively identical (280 to 290 MHv) and at near the half thickness (z/t=0.5) of the specimen, the microhardness of the laser peened specimen (~201 MHv) is about 4 MHv lower than the value of the laser peened and hydrogenated specimen (~205 MHv). Nevertheless, the overall behaviors of the two profiles are fairly similar.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:
1. A method, comprising:
    laser peening a metal surface and sub-layer to densify said metal surface and said sub-layer to initiate retardation of the up-take and penetration of hydrogen, wherein said metal surface is selected from the group consisting of steel, titanium and aluminum, wherein the step of laser peening comprises directing a laser pulse at least 2 times onto said metal surface, wherein said laser pulse has a pulse duration of at least 20 ns, wherein said laser pulse has an area on said metal surface of at least 20 mm$^2$ and wherein said laser pulse comprises an energy density of about 10 GW/cm$^2$ for steel and titanium and about 4 GW/cm$^2$ for aluminum.
2. The method of claim 1, wherein said laser pulse comprises a spot size of about 3.0 mm for steel and titanium and 4.7 cm for aluminum.

3. The method of claim 1, wherein said laser beam comprises a 50% spatial offset, or overlap, from one peening layer to another.

4. The method of claim 1, wherein said area is peened at least two times.

5. The method of claim 1, wherein said pulse duration is selected such that the compression produced by a laser-generated shock front progresses sufficiently deep within said sub-layer to produce said retardation before a rarefaction due to the end of said laser pulse propagating through the densified material catches up to said shock front and dissipates the peening action.

6. The method of claim 1, wherein said laser pulse comprises a spot size, a pulse width and an energy selected to simultaneously induce residual stress and increase the density of said surface and said sub-layer as deeply as possible in the near surface material while minimizing the generation of intergranular disruptions.

7. The method of claim 1, wherein the step of laser peening includes covering said workpiece with a layer of material that absorbs said laser pulse, wherein said laser pulse comprises a square or rectangular cross-section and a 3% spatial offset, or overlap, from one peening layer to another.

8. The method of claim 1, wherein the step of laser peening includes covering said workpiece with a layer of material that absorbs laser light.

9. The method of claim 1, further comprising imaging the near field of said laser pulse to a spot size on said metal workpiece.

10. The method of claim 1, wherein the step of laser peening comprises flowing a thin layer of water over said material, wherein said thin layer of water acts as a tamping layer.

* * * * *